(12) United States Patent
Albers

(10) Patent No.: US 9,254,929 B2
(45) Date of Patent: Feb. 9, 2016

(54) REUSABLE FOOD CONTAINER WITH RE-SEALABLE CAP

(71) Applicant: Luft Industrie Inc., Oakland, CA (US)

(72) Inventor: Oliver Albers, Oakland, CA (US)

(73) Assignee: Luft Industrie Inc., Oakland, CA (US)

( * ) Notice: Subject to any disclaimer, the term of this patent is extended or adjusted under 35 U.S.C. 154(b) by 93 days.

(21) Appl. No.: 14/139,250

(22) Filed: Dec. 23, 2013

(65) Prior Publication Data

US 2015/0173540 A1 Jun. 25, 2015

(51) Int. Cl.

| | |
|---|---|
| *A47G 19/22* | (2006.01) |
| *B65B 3/04* | (2006.01) |
| *B65D 47/12* | (2006.01) |
| *B65D 47/06* | (2006.01) |
| B65D 47/14 | (2006.01) |
| B65D 43/02 | (2006.01) |
| B65D 25/40 | (2006.01) |
| B65D 25/48 | (2006.01) |
| F16J 15/32 | (2006.01) |

(52) U.S. Cl.
CPC ............ *B65B 3/045* (2013.01); *A47G 19/2266* (2013.01); *B65D 47/068* (2013.01); *B65D 47/121* (2013.01); *A47G 19/2272* (2013.01); *B65D 25/40* (2013.01); *B65D 25/48* (2013.01); *B65D 43/021* (2013.01); *B65D 47/141* (2013.01); *F16J 15/3268* (2013.01)

(58) Field of Classification Search
CPC .................. B65D 25/40; B65D 25/48; B65D 2543/00046; B65D 35/38; B65D 35/42; B65D 41/023; B65D 41/28; B65D 41/30; B65D 41/00; B65D 41/06; B65D 41/068; B65D 47/121; B65D 47/141; B65D 43/021; B65D 43/022; B65D 43/0254; A47G 19/2266; A47G 19/2272

See application file for complete search history.

(56) References Cited

U.S. PATENT DOCUMENTS

| 134,862 | A | * | 1/1873 | Bruns ........................... 296/138 |
|---|---|---|---|---|
| 2,228,936 | A | * | 1/1941 | Walter ........................... 215/262 |
| 4,303,170 | A | * | 12/1981 | Panicci .............. A47G 19/2261 215/376 |
| 4,813,563 | A | * | 3/1989 | Ogden et al. ................... 215/253 |
| 5,147,066 | A | * | 9/1992 | Snider ................ A47G 19/2272 220/703 |
| 5,820,016 | A | * | 10/1998 | Stropkay ........................ 229/403 |
| 5,897,019 | A | * | 4/1999 | Stropkay .............. B65D 17/161 206/519 |
| 2005/0199639 | A1 | * | 9/2005 | Tucker et al. .................. 220/780 |
| 2012/0000923 | A1 | * | 1/2012 | Powell ............... B65D 43/0212 220/780 |
| 2013/0186918 | A1 | * | 7/2013 | Menceles et al. ............. 222/567 |
| 2013/0233870 | A1 | * | 9/2013 | Miller .................... A47G 19/22 220/719 |
| 2014/0263453 | A1 | * | 9/2014 | Haley et al. ................... 222/152 |

\* cited by examiner

*Primary Examiner* — Anthony Stashick
*Assistant Examiner* — Mollie Llewellyn
(74) *Attorney, Agent, or Firm* — Onello & Mello, LLP

(57) ABSTRACT

Provided is a reusable food storage container, comprising a vessel that can store a food and/or beverage and a removable cap that closes the vessel. The cap can have a tube or other through-passage formed therein to enable a user to squeeze or draw out the contents of the vessel. The cap can include a mouthpiece and a plug to close the mouthpiece. The cap can be configured to make at least one of a seal, e.g., an airtight and/or water tight-seal, with the vessel, by being press fit into the top of the vessel. And the plug can be configured to close and seal the mouthpiece.

20 Claims, 4 Drawing Sheets

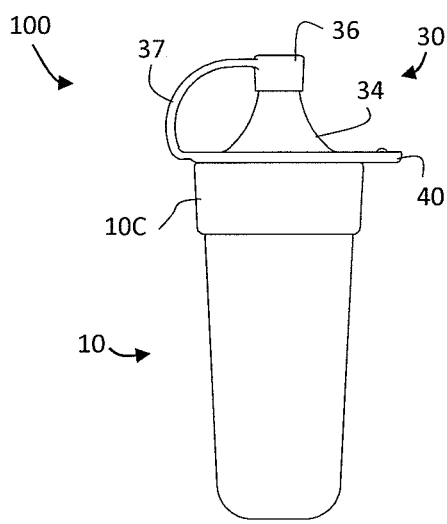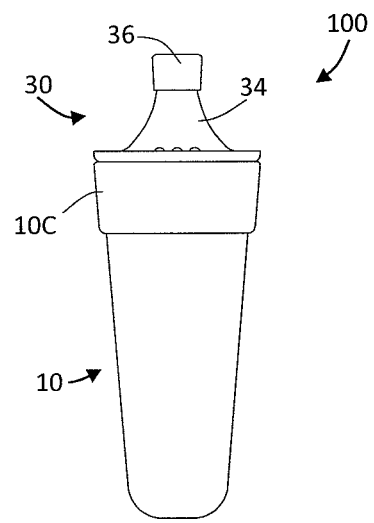
FIG. 7         FIG. 8
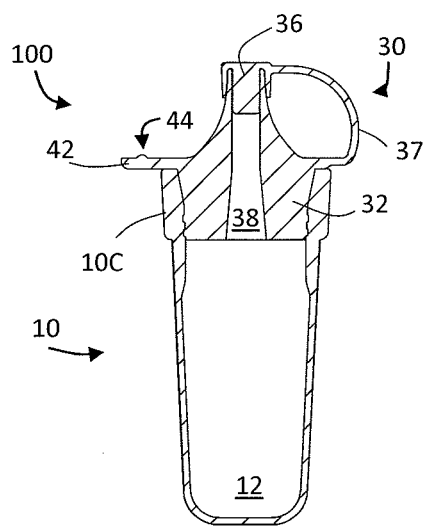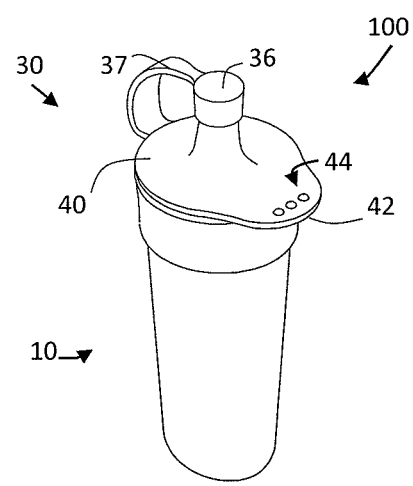
FIG. 9         FIG. 10

REUSABLE FOOD CONTAINER WITH RE-SEALABLE CAP

FIELD OF INTEREST

The present inventive concepts relate to the field of food containers, and more particularly to the field of food containers with covers and caps.

BACKGROUND

Presently, myriad forms of reusable food and beverage containers exist in the marketplace. As an example, many types of water bottles, or other drink containers, exist. And, many type of food storage containers exist. Some are geared for infants, while others are geared for teens and adults. Some beverage containers are made with insulating properties, e.g., travel coffee mugs and thermoses.

Reusable beverage containers can include screw-type caps. In such cases, the cap has a "female"-threaded rim configured that corresponds to a "male"-threaded opening of a vessel that holds the beverage. The cap is screwed off to provide access to the opening of the vessel and screwed on to close the opening, or vice versa. Some food containers include snap-on caps (or lids, or covers), wherein the cap includes a recess that accommodates a corresponding protruding rim at the opening of the vessel, e.g., as with a sandwich container.

With particular regard to beverage containers, some such caps include a rigid mouthpiece through which a person can receive a beverage within the vessel, such as with children's "sippy cups." The rigid mouthpiece can be formed as part of the cap and immovable, e.g., as a molded plastic cap. In other designs, a "pop cap" is used, where a mouthpiece has an open position and a closed position, and the mouthpiece can be popped open from the closed position. These can be effective in preventing leakage of the vessel's contents, and for preventing contamination of the container contents from entry of external matter.

Despite these various types of reusable food and beverage containers, it would be beneficial to have a reusable food and beverage container that was configured to allow a user to easily form an airtight and/or water-tight seal between the cap and the vessel that is simple to use and cost effective. Such an container could further reduce the waste and environmental impacts of widely used disposable containers, such as disposable food and beverage containers. That is, in a world where all things single-use, are made of plastic, there is a detrimental environmental impact—particularly given the sales and distribution volume of such single-use food and beverage containers.

SUMMARY

Provided is a reusable food storage container, comprising a vessel that can store a food and/or beverage and a removable cap that closes the vessel. The cap can have a tube or other through-passage formed therein to enable a user to squeeze or draw out the contents of the vessel. The cap can include a mouthpiece and a plug to close the mouthpiece. The cap can be configured to make a seal, such as at least one of an airtight seal and water tight-seal, with the vessel when press fit into the top of the vessel. And the plug can, preferably, be configured to make an airtight seal and water tight-seal with the mouthpiece.

In accordance with one aspect of the present disclosure, provided is a reusable food container, comprising a vessel defining a food storage volume, and having a top portion defining an opening, and a re-sealable cap configured to removably close the opening. The re-sealable cap includes a bottom portion structured to form a press-fit seal with the opening, a mouthpiece configured to access food in the food storage volume through a food passage formed through the cap, and a removable plug configured to close the mouthpiece.

In some embodiments, the plug can be structured to form a press fit, airtight seal with the mouthpiece.

In some embodiments, the cap can be configured to form a press-fit airtight seal with the vessel opening.

In some embodiments, the cap bottom portion can include a cone-shaped wall having an upper diameter greater than a lower diameter; the vessel top portion can include a cone-shaped interior wall having an upper diameter greater than a lower diameter; the vessel top portion cone-shaped wall can be configured to receive the cap bottom portion cone-shaped wall; the upper and lower diameters of the vessel top portion can be smaller, e.g., slightly smaller, than the upper and lower diameters of the cap bottom portion; and the cap bottom portion cone-shaped wall and the vessel top portion cone-shaped wall can be configured to form an airtight and/or water-tight seal when the cap is press fit into the vessel opening.

In some embodiments, a rim can be disposed at the upper diameter of the vessel top portion cone-shaped wall and at the opening.

In some embodiments, the cap bottom portion can further include a region with one or more protruding rings; the vessel top portion can further include a region with one or more recessed rings; and the recessed rings can be configured to receive the protruding rings.

In some embodiments, the vessel and cap can be made of an elastomeric material.

In some embodiments, the vessel and cap can be made of silicone.

In some embodiments, a rim can circumscribe the vessel opening and the cap can further include a planar top portion from which the mouthpiece upwardly extends, and the top portion can have a sufficient width to substantially cover the rim of the vessel when the cap is press fit into the vessel.

In some embodiments, the cap top portion can further include a tab that takes the form of a lateral extension of the top portion that overhangs the rim more than other parts of the top portion.

In some embodiments, the tab can include a set of vertical protrusions configured to facilitate gripping of the tab by a user.

In accordance with another aspect of the invention, provided is a reusable food container, comprising: a vessel defining a food and beverage storage volume, and having a rim defining an opening, and a re-sealable cap configured to form a press-fit airtight seal closing the opening of the vessel. The cap includes a mouthpiece structured to provide access to the food and beverage storage volume through the cap when the cap is press fit into the vessel opening. The cap includes a cone-shaped wall having an upper diameter greater than a lower diameter. The vessel includes a cone-shaped wall having an upper diameter greater than a lower diameter. The vessel cone-shaped wall is configured to receive the cap cone-shaped wall. The upper and lower diameters of the vessel cone-shaped wall are smaller, e.g., slightly smaller, than the upper and lower diameters of the cap cone-shaped wall. The cap cone-shaped wall and the vessel cone-shaped cooperate to form an airtight and/or water-tight seal when the cap is press fit into the vessel opening.

In some embodiments, the cap further can include a top portion that covers the vessel rim when the cap is press fit into the vessel.

In some embodiments, the vessel cone-shaped wall and the cap cone-shaped wall can be made of silicone.

In some embodiments, the cap can further include a region with one or more protruding rings, the vessel can further include a region with one or more recessed rings, and the recessed rings can be configured to receive the protruding rings.

In some embodiments, at least one of the one or more protruding rings and the one or more recessed rings can be made of a compressible material.

In accordance with another aspect of the present invention, provided is a method of storing food in a reusable container. The method comprises providing a vessel defining a food storage volume having a top portion defining an opening and providing a re-sealable cap configured to removably close the opening. The cap comprises a mouthpiece configured to access food in the food storage volume through a food passage formed through the cap; a removable plug configured to close the mouthpiece; and a bottom portion structured to form a press fit, airtight seal with the vessel opening. The method further includes, press fitting the cap bottom portion into the vessel opening top portion.

In some embodiments, a rim can circumscribe the vessel opening and the cap can further include a planar top portion from which the mouthpiece upwardly extends, and the top portion can have a sufficient width to substantially cover the rim of the vessel when the cap is press fit into the vessel.

In some embodiments, the cap top portion further includes a tab that takes the form of a lateral extension of the top portion that overhangs the rim more than other parts of the top portion, and the method further includes breaking the seal between the cap and the vessel by lifting the tab upward and away from the vessel.

In some embodiments, the cap bottom portion can further include a region with one or more protruding rings and the vessel top portion can further include a region with one or more recessed rings. The method can further include the recessed rings receiving the protruding rings when the cap is press fit into the vessel.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIGS. 7 through 10 show an embodiment of a reusable food container with cap on and a mouthpiece plug on, from side, front, side cross-sectional, and oblique views, in accordance with aspects of the inventive concept.

DETAILED DESCRIPTION OF PREFERRED EMBODIMENTS

Figure 1:
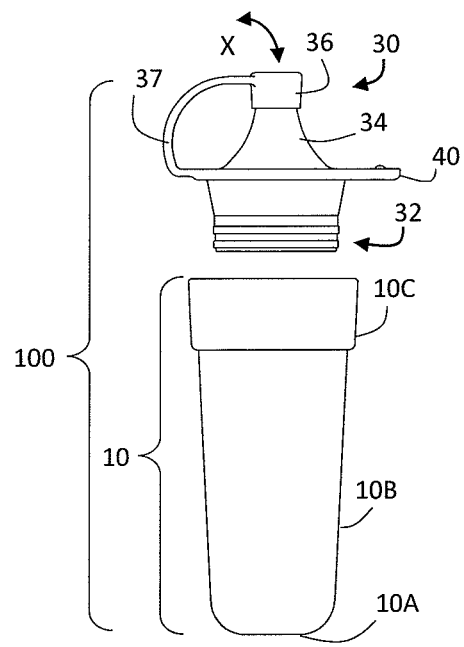
FIGS. 1 through 4 and 6 show an embodiment of a reusable food container with cap off and a mouthpiece plug on, from side, front, side cross-sectional, and oblique views, in accordance with aspects of the inventive concept.
Figure 2:
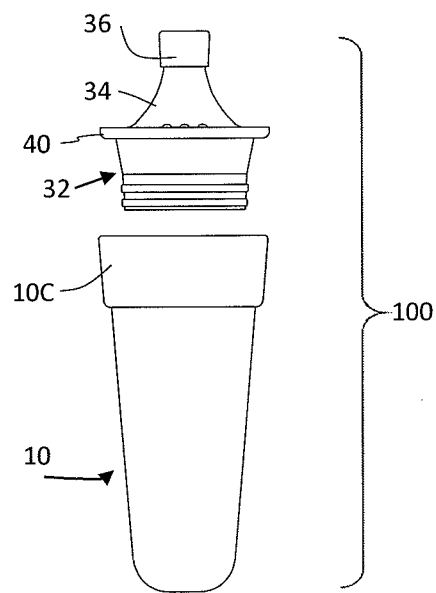
Figure 3:
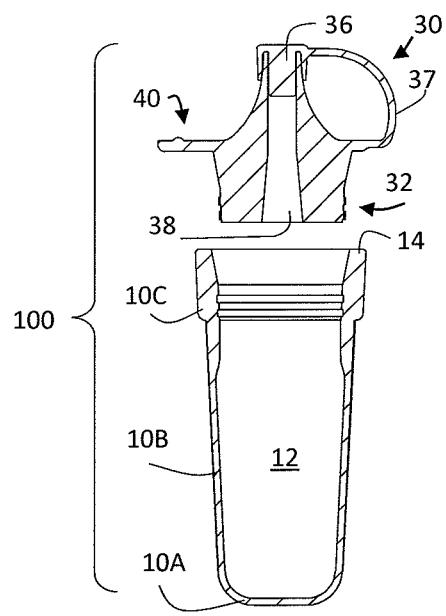

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein, but are to include deviations in shapes that result, for example, from manufacturing.

Figure 4:
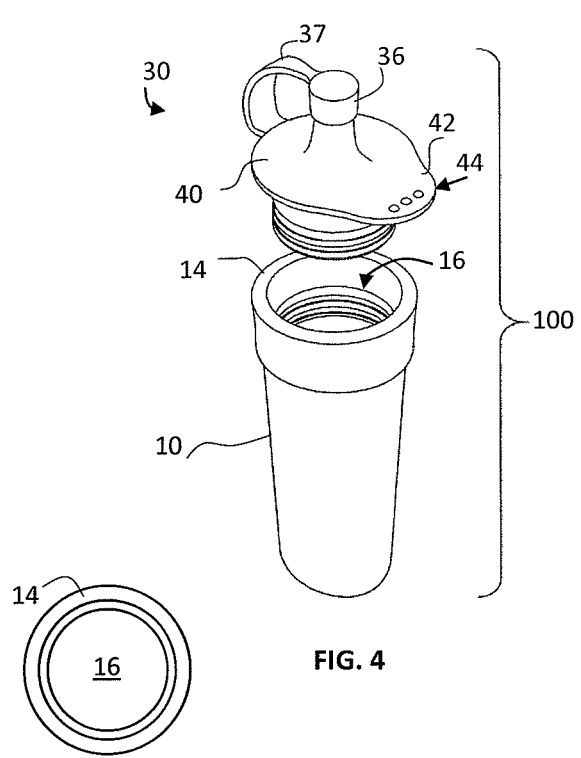
Figure 5:
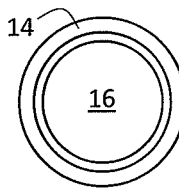
FIG. 5 shows a top view of a vessel of the reusable food container of FIGS. 1-4.

FIGS. 1 through 4 and 6 show an embodiment of a reusable food container 100 comprising a vessel 10 and a cap 30 (e.g., an airtight and/or water-tight cap), in accordance with aspects of the inventive concept. These views provide side, front, side cross-sectional, and oblique views of vessel 10 and cap 30. In these views, cap 30 is off (separated, removed or disengaged). FIG. 5 is a top view of the vessel 10, without the cap 30. FIGS. 7 through 10 show an embodiment of the reusable food container 100 with cap 30 on and a mouthpiece plug 36 on, from side, front, side cross-sectional, and oblique views, in accordance with aspects of the inventive concept. FIGS. 11 through 14 show an embodiment of the reusable food container 100 with cap 30 on and a mouthpiece plug 36 off, from side, front, side cross-sectional, and oblique views, in accordance with aspects of the inventive concept.

Vessel 10 defines an internal volume 12 (see FIGS. 3, 6, 9, and 13) that can be used to hold food and/or a beverage. The internal volume 12, therefore, can provide at least one storage compartment of the reusable food container 100. In this embodiment, there is only one storage compartment within the internal volume 12. Vessel 10 can include a bottom 10A, a sidewall 10B, and a top 10C. Top 10C includes a rim 14 that defines an opening 16 that enables access to internal volume 12 of vessel 10, e.g., for filing with a food and/or beverage, cleaning, and so on. In this embodiment, an interior circumference of rim 14 and opening 16, therefore, are circular, as shown in FIGS. 4 and 5.

Cap 30 can be a re-sealable cap configured to removably close the opening 16 to maintain a food and/or beverage in the internal volume 12. Cap 30 can be configured to create an airtight and/or water-tight seal with vessel 10.

In this embodiment, the re-sealable cap 30 comprises a bottom portion 32, a mouthpiece 34, and a mouthpiece plug 36. A food passage 38 (e.g., a tube) is formed within and through cap 30, extending from bottom portion 32 to mouthpiece 34. Mouthpiece plug 36 is configured to removably close mouthpiece 34, so a user can have selective access to the food and/or beverage contents. In this embodiment, plug 36 is structured to form a pressure fit with mouthpiece 34, and can be coupled to another portion of the cap 30 with a tether 37. Preferably, plug 36, when engaged to close the mouthpiece 34, prevents food and/or beverage leakage from vessel through mouthpiece 34. Furthermore, in some embodiments, plug 36 forms an airtight seal with mouthpiece 34. Plug 36 can be removed or disengaged from mouthpiece 34 by pulling up and away from the mouthpiece 34, as shown by the double arrow X in FIG. 1, in this embodiment.

Re-sealable cap 30 further includes a generally planar top portion 40, from which mouthpiece 34 upwardly extends or projects, in this embodiment. Also in this embodiment, top portion 40 has sufficient width to overhang and cover rim 14 of vessel 10 when cap 30 is engaged with vessel 10, as shown in FIGS. 7-14. Top portion 40 also includes a tab 42, which takes the form of an extension of the top portion 40 that overhangs rim 14 more than the other parts of top portion 40, in this example embodiment. Here, tab 42 optionally includes a set of protrusions 44 that can facilitate better gripping by a user, e.g., between a finger and thumb of a user. Pulling on tab 40 can enable a user to quickly and easily lift and remove cap 30 from vessel 10, while breaking the seal between the cap 30 and vessel 10.

Bottom portion 32 of cap 30 is structured to form a pressure fit with the vessel 10 opening 16. Accordingly, at least one of bottom portion 32 of cap 30 and an inner region of the top portion 10C of vessel 10 is preferably compressible, i.e., made from a compressible memory material, e.g., silicone, rubber, and other elastomeric materials. In some embodiments, vessel 10 and cap 30 can be completely made of silicone, e.g., molded silicone. In other embodiments, one or both of the vessel top portion 10C and cap 30 bottom portion 32, or engaging portions of each, can be made of silicone, or the like.

In the preferred embodiment, cap 30 is inserted into vessel 10 forming a pressure fit, whereby a vessel female coupling (interior of top portion 10C) is smaller in diameter than a male bottom portion 32 of cap 30. When the cap 30 and vessel 10 are pushed together, an airtight and water-tight seal between the two is formed, such as is shown in FIGS. 7-14. In some embodiments, this can also create an airtight and/or water-tight seal.

Figure 6:
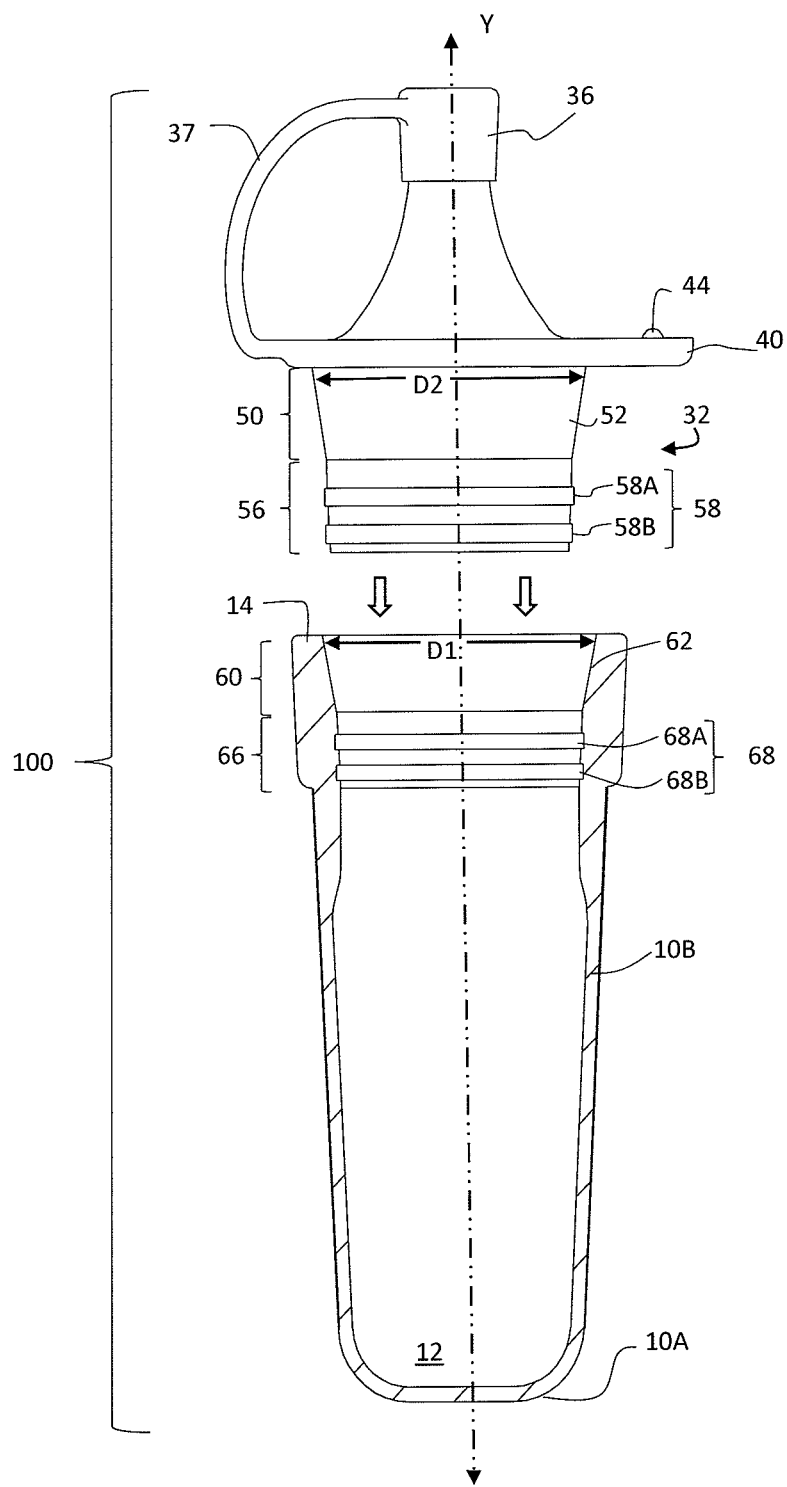
Figure 11:
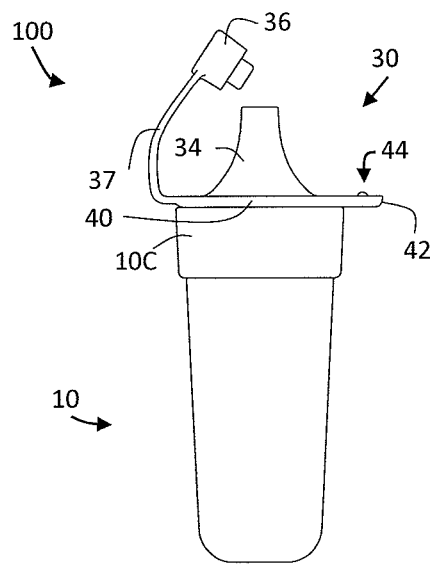
FIGS. 11 through 14 show an embodiment of a reusable food container with cap on and a mouthpiece plug off, from side, front, side cross-sectional, and oblique views, in accordance with aspects of the inventive concept.
Figure 12:
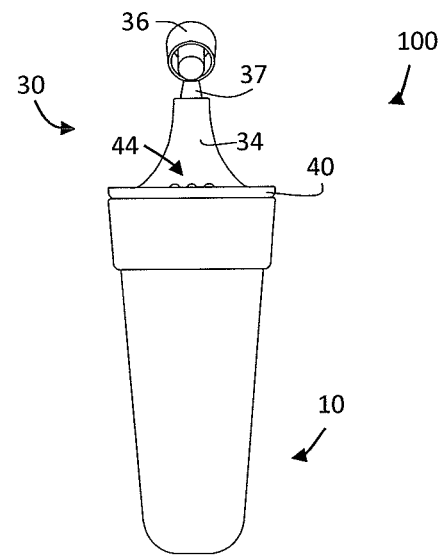
Figure 13:
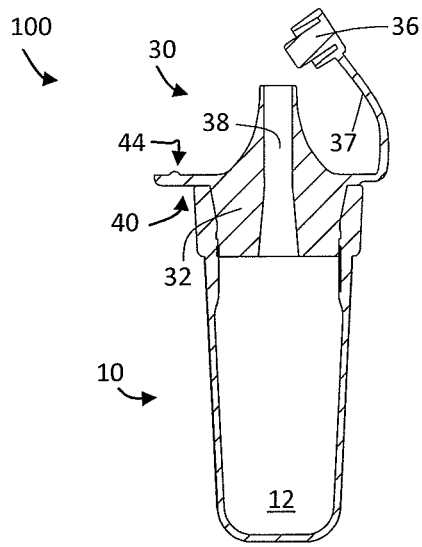
Figure 14:
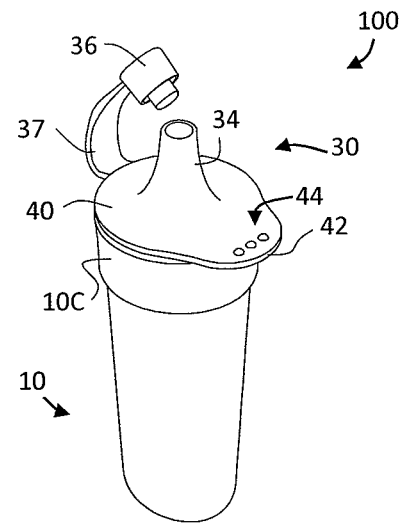

Referring to FIG. 6, reusable food container 100 is shown, with cap 30 shown in solid view and vessel 10 shown in cross-sectional, which is scaled up to better show features of the embodiment. The bottom portion 32 of cap 10 can be considered to be a "male" component and the inner structure of top portion 10C of vessel 10 can be considered to be a corresponding "female" component—forming a male-female coupling when the bottom portion 32 of cap 10 is press fit into top portion 10C of vessel 10.

In particular, bottom portion 32 of cap 30 and top portion 10C of vessel 10 include several features that can create a seal that is also airtight and water tight. Bottom portion 32 has an upper region 50 and a lower region 56. Upper region 50 is cone-shaped, with its wall 52 sloping or angling upwardly and away from a central vertical axis Y. Here cone-shaped can mean a truncated cone. Lower region 56 is generally tubular, comprising at least one outwardly protruding ring 58. In this embodiment, there are two outwardly protruding rings 58A, 58B. In other embodiments, there could be more or less (i.e., one or none) outwardly protruding rings. In other embodiments, lower region 56 could be omitted altogether.

Top portion 10C of vessel 10 includes features configured to mate with features of bottom portion 32 of cap 30. In this embodiment, top portion 10C includes an upper region 60 that is also cone-shaped, with its wall 62 sloping or angling upwardly and away from central vertical axis Y. The diameter D1 of cone-shaped wall 62 is slightly smaller than the diameter D2 of the cone-shaped wall 52 of the bottom portion 32 of cap 30, e.g., D1 can be more than 0% and less than about 2% smaller than D2. This relationship between D1 and D2 can be maintained over a vertical portion of the cone-shaped wall 62 of vessel 10 top portion 10C and the cone-shaped wall 52 of bottom portion 32 of cap 30, since such diameters diminish, e.g., linearly, going from top to bottom in FIG. 6, in this embodiment. The cone-shaped wall 52 of bottom portion 32 of cap 30 and the cone-shaped wall 62 of the top portion 10C of vessel 10 can have substantially the same angle with respect to central axis Y, as shown in this embodiment.

Top portion 10C also includes a lower region 66 that is generally tubular, defining at least one recessed ring 68, or ringed depression. In this embodiment, there are two recessed rings 68A, 68B. In other embodiments, there could be more or less (i.e., one or none) recessed rings. In various embodiments, the number of outwardly protruding rings 58 and the number of recessed rings 68 will be the same. In other embodiments, lower region 66 could be omitted altogether, particularly if lower region 56 of cap 30 bottom portion 32 is omitted.

In the preferred embodiment, cap 30 is pressed into the opening 16 in vessel 10, shown by the two downward pointing arrows. This downward motion can cause air inside vessel to be forced out between cone-shaped wall 52 and cone-shaped wall 62 as cap 30 is inserted into vessel 10, thus creating a seal, which can help secure and hold cap 30 in place. No other physical or structural elements need to be included to create the seal, but the plug 36 should be inserted to close mouthpiece 34. Further downward pressing of cap 30 into opening 16 of vessel 10 causes outwardly protruding rings 58 of cap 30 to get seated into recessed rings 68 of vessel 10, owing to the pliability and/or elasticity of outwardly protruding rings 58 and/or the inner portions of vessel top portion 10C. This is shown, as examples, in FIGS. 9 and 13, wherein cap 30 is fully inserted into the vessel 10, creating a seal between the two that can be a seal, e.g., a water-tight and/or an airtight seal. To break the seal, a user can pull up on tab 42 of cap 30. Receipt of outwardly protruding rings 58 of cap 30 into recessed rings 68 of vessel 10 can further secure cap 30 to vessel 10, although cap 30 can still be removed by lifting tab 40 upward and away from vessel 10, also breaking the seal between the two, whether water tight and/or airtight.

In accordance with the inventive concept, there can be provided, for example, an all-silicone food container 100 that can be used as a reusable food and/or beverage pouch, where food or a beverage can be inserted and then the cap 30 applied and, subsequently, the food and/or beverage squeezed or drawn from the vessel 10 through the cap 30. The "plug" style smaller cap (plug 36) is also pressure-fit and needs to be removed before the food and/or liquid can be drawn or squeezed through the cap, e.g., via mouthpiece 34.

Today, too many single use pouches are thrown into landfills and other pouches available are either all plastic (e.g., a plastic film mouthpiece and cap) or they are a silicone/plastic hybrid (with plastic caps, collars, etc.) to help hold the item together. The present invention, however, with, for example, an all-silicone design and pressure-fit caps, eliminates the need for any plastic components.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A reusable beverage container, comprising:
    a vessel defining a beverage storage volume and having a top portion defining an opening, the vessel top portion including:
        a cone-shaped upper region having an inner wall tapering downwardly from the opening; and
        a tubular lower region extending downwardly from the cone-shaped upper region and having one or more ring recesses formed therein; and
    a re-sealable cap configured to removably close the opening, the re-sealable cap comprising:
        a planar top portion from which a mouthpiece upwardly extends;
        a removable plug configured to close the mouthpiece;
        a bottom portion structured to form a press-fit seal with the opening, the bottom portion including:
            a cone-shaped upper region having a wall tapering downwardly from the planar top portion; and
            a tubular lower region extending downwardly from the cone-shaped upper region, and having one or more protruding rings corresponding to the one or more ring recesses of the vessel.

2. The apparatus of claim 1, wherein the plug is structured to form a press fit, airtight seal with the mouthpiece.

3. The apparatus of claim 1, wherein the cap is configured to form a press-fit airtight seal with the vessel opening.

4. The apparatus of claim 1, wherein:
    the cap bottom portion cone-shaped upper region has an upper diameter greater than a lower diameter;
    the vessel top portion cone-shaped upper region has an upper diameter greater than a lower diameter;
    the vessel top portion cone-shaped upper region is configured to receive the cap bottom portion cone-shaped upper region; and
    the upper and lower diameters of the vessel top portion cone-shaped are smaller than the upper and lower diameters of the cap bottom portion cone-shaped upper region; and
    the cap bottom portion and the vessel top portion are configured to form an airtight seal when the cap is press fit into the vessel opening.

5. The apparatus of claim 1, wherein the vessel and cap are made of an elastomeric material.

6. The apparatus of claim 1, wherein the vessel and cap are made of silicone.

7. The apparatus of claim 1, wherein a rim circumscribes the vessel opening and the cap planar top portion has a sufficient size to substantially cover the rim of the vessel when the cap is press fit into the vessel.

8. The apparatus of claim 7, wherein the cap top portion further includes a tab that takes the form of a lateral extension of the top portion that overhangs the rim more than other parts of the top portion.

9. The apparatus of claim 8, wherein the tab includes a set of vertical protrusions configured to facilitate gripping of the tab by a user.

10. A reusable beverage container, comprising:
    a vessel defining a beverage storage volume and having a rim defining an opening, a top portion of the vessel including:
        a cone-shaped upper region having an inner wall tapering downwardly from the opening; and
        a tubular lower region extending downwardly from the cone-shaped upper region and having one or more ring recesses formed therein; and
    a re-sealable cap configured to close the opening of the vessel, the cap including:
        a planar top portion from which a mouthpiece upwardly extends, wherein the mouthpiece is structured to provide access to the beverage storage volume when the cap is press fit into the opening of the vessel;
        a bottom portion structured to form a press fit, airtight seal with the top portion of the vessel, the bottom portion including:
            a cone-shaped upper region having a wall tapering downwardly from the planar top portion; and
            a tubular lower region extending downwardly from the cone-shaped upper region, and having one or more protruding rings corresponding to the one or more ring recesses of the vessel,
    wherein:
        the cap bottom portion cone-shaped upper region has an upper diameter greater than a lower diameter;
        the vessel cone-shaped upper region has an upper diameter greater than a lower diameter;
        the vessel top portion cone-shaped upper region is configured to receive the cap bottom portion cone-shaped upper region; and the upper and lower diameters of the vessel top portion cone-shaped upper region are smaller than the upper and lower diameters of the cap bottom portion cone-shaped upper region; and the cap cone-shaped upper region and the vessel cone-shaped upper region cooperate to form the airtight seal when the cap is press fit into the vessel opening.

11. The container of claim 10, wherein the cap planar top portion covers the vessel rim when the cap is press fit into the vessel.

12. The container of claim 10, wherein the vessel cone-shaped upper region and the cap cone-shaped upper region are made of silicone.

13. The container of claim 10, wherein at least one of the one or more protruding rings and the one or more recessed rings are made of a compressible material.

14. A method of storing a beverage in a reusable container, comprising:

providing a vessel defining a storage volume and having a top portion defining an opening, the vessel including:
a cone-shaped upper region having an inner wall tapering downwardly from the opening; and
a tubular lower in downwardly from the cone-shaped upper region and having one or more ring recesses formed therein;

providing a re-sealable cap configured to removably close the opening, the cap comprising:
a planar top portion from which a mouthpiece upwardly extends, the mouthpiece configured to provide access to the storage volume; and
a bottom portion structured to form a press fit, airtight seal with the vessel top portion, the bottom portion including:
a cone-shaped upper region having a wall tapering downwardly from the planar top portion; and
a tubular lower region extending downwardly from the cone-shaped upper region, and having one or more protruding rings corresponding to the one or more ring recesses of the vessel; and press fitting the cap bottom portion into the vessel top portion, thereby forming a seal between the cap and the vessel.

15. The method of claim 14, wherein a rim circumscribes the vessel opening and the cap planar top portion has a sufficient size to substantially cover the rim of the vessel when the cap is press fit into the vessel.

16. The method of claim 15, wherein the cap top portion further includes a tab that takes the form of a lateral extension of the planar top portion, wherein the lateral extension overhangs the rim more than other parts of the planar top portion, and the method further comprises:
breaking the seal between the cap and the vessel by lifting the tab upward and away from the vessel.

17. The method of claim 14, wherein
the method further includes the recessed rings receiving the protruding rings when the cap is press fit into the vessel.

18. The container of claim 1, wherein the removable plug includes a portion configured to cover an outer portion of the mouthpiece and a portion configured to project inside the mouthpiece.

19. The container of claim 10, further comprising a removable plug configured to close the mouthpiece, wherein the removable plug includes a portion configured to cover an outer portion of the mouthpiece and a portion configured to project inside the mouthpiece.

20. The method of claim 14, wherein the re-sealable cap includes a removable plug having a portion configured to cover an outer portion of the mouthpiece and a portion configured to project inside the mouthpiece, and the method includes:
press fitting the removable plug onto the mouthpiece to create an airtight seal.

* * * * *

UNITED STATES PATENT AND TRADEMARK OFFICE
CERTIFICATE OF CORRECTION

Page 1 of 1

PATENT NO. : 9,254,929 B2
APPLICATION NO. : 14/139250
DATED : February 9, 2016
INVENTOR(S) : Oliver Albers It is certified that error appears in the above-identified patent and that said Letters Patent is hereby corrected as shown below:

In the Claims:

At column 8, line 12, please insert the word --upper-region-- after the word "cone-shaped" and before the word "are"; and At column 9, line 23, please delete the word "in" and insert the words --region extending-- after the word "lower" and before the word "downwardly".

Signed and Sealed this
Sixteenth Day of August, 2016

Michelle K. Lee
*Director of the United States Patent and Trademark Office*